(12) United States Patent
Harder et al.

(10) Patent No.: US 12,318,642 B2
(45) Date of Patent: Jun. 3, 2025

(54) MODULAR CONSTRUCTION FIRE STOP ASSEMBLY

(71) Applicant: Balco, Inc., Wichita, KS (US)

(72) Inventors: John Harder, Wichita, KS (US); Sai Pottavathri, Manvel, TX (US); Steve Chavers, Haysville, KS (US)

(73) Assignee: Balco, Inc., Wichita, KS (US)

( * ) Notice: Subject to any disclaimer, the term of this patent is extended or adjusted under 35 U.S.C. 154(b) by 351 days.

(21) Appl. No.: 18/100,841

(22) Filed: Jan. 24, 2023

(65) Prior Publication Data

US 2023/0249015 A1    Aug. 10, 2023

Related U.S. Application Data

(60) Provisional application No. 63/308,575, filed on Feb. 10, 2022.

(51) Int. Cl.
| | |
|---|---|
| *B32B 9/04* | (2006.01) |
| *A62C 2/06* | (2006.01) |
| *B32B 5/20* | (2006.01) |
| *B32B 27/40* | (2006.01) |

(52) U.S. Cl.
CPC ............... *A62C 2/065* (2013.01); *B32B 5/20* (2013.01); *B32B 9/046* (2013.01); *B32B 27/40* (2013.01); *B32B 2250/04* (2013.01); *B32B 2255/205* (2013.01); *B32B 2305/022* (2013.01); *B32B 2305/18* (2013.01); *B32B 2307/3065* (2013.01); *B32B 2311/24* (2013.01)

(58) Field of Classification Search
CPC ... A62C 2/065; B32B 9/046; B32B 2255/205; B32B 2305/022; B32B 2305/18; B32B 2307/3065; B32B 2311/24; B32B 3/04; B32B 3/06; B32B 27/065; B32B 2307/306; B32B 5/18; E04B 1/948; E04B 1/34815; E04B 1/6815; E04B 1/74; E04B 1/88; E04B 1/94; E04B 2/7411
See application file for complete search history.

(56) References Cited

U.S. PATENT DOCUMENTS

| | | | | |
|---|---|---|---|---|
| 4,349,494 | A * | 9/1982 | Fulmer | B29C 44/1214 264/129 |
| 4,811,529 | A * | 3/1989 | Harris | E04B 1/6815 428/920 |
| 11,459,749 | B2 * | 10/2022 | Harder | E04B 1/947 |

* cited by examiner

*Primary Examiner* — Patrick J Maestri
(74) *Attorney, Agent, or Firm* — Dickinson Wright PLLC

(57) ABSTRACT

An improved fire barrier assembly is disclosed for use between two structures, either in a compressive mode or a combination compression/shear mode. The assembly includes at least a single foam core, or two foam cores separated by a gap. At least one foam core includes an intumescent layer. An outer wrap of a fire-resistant fabric surrounds the foam core. The assembly is fastened to one surface of one structure.

23 Claims, 5 Drawing Sheets

MODULAR CONSTRUCTION FIRE STOP ASSEMBLY

This application is based on priority of U.S. provisional application 63/308,575, filed Feb. 10, 2022, and entitled Modular Construction Fire Stop Assembly, which application is hereby incorporated by reference in its entirety and made a part of this Application.

FIELD OF THE INVENTION

The invention relates to modular building systems with factory applied fire barrier systems.

BACKGROUND OF THE INVENTION

In order to optimize building design flexibility, cost, and adaptability, modular building systems have been developed for residential, commercial and industrial application. However, existing prior art modular building systems have several drawbacks, which the present invention seeks to overcome.

Current prior art construction methods generally require that much of the construction work to be performed at the building site. There exist some prefabrication methods that seek to reduce the amount of on-site work, thereby realizing some cost savings. Increasing the ratio of factory-based assembly to on-site work further reduces construction costs and improves the quality of construction because of the quality control and processes that can implemented in a factory as opposed to using on-site labor. This efficiency and improved quality is achieved by delivering to a building site finished modules which may be very quickly assembled on-site.

According to prior art prefabrication technologies, building components are transported to building sites as panels and are erected and finished on-site. Often the finishing of the prefab systems requires labor intensive fire barrier assemblies applied by hand between modular components at the building site. In some instances, the modular structure makes it difficult or impossible to add fire barrier assemblies on site due to of lack of access. What is needed are fire barrier assemblies that can be applied in the factory and are efficacious when the modular components are placed together at the building site.

SUMMARY OF THE INVENTION

In at least one embodiment, disclosed herein, is a fire barrier assembly intended for modular building units. A first modular building unit has a first surface intended to be positioned adjacent to a second surface of a second modular building unit. In order to save on labor costs and improve quality control the first modular building unit has an elongated fire barrier attached to it.

In at least one embodiment the elongated fire barrier assembly comprises (a) a modular building unit having a first surface intended to be positioned adjacent to a second surface on a second modular building unit; (b) a lower foam core, the lower foam core comprising at least a first layer of foam and a second layer of foam with at least one intumescent layer sandwiched between the first and second foam layers; (c) an outer wrap of a fire resistant fabric surrounding the lower foam core and upper foam core and bridging the gap; and (d) a series of fasteners to attach the elongated fire barrier assembly to the first surface of the modular building unit, the fasteners attaching the fire-proof fabric to the first surface at the gap.

In yet another embodiment, the foam cores are surrounded by a fire-proof wrap that is an aluminum coated fabric that is attached to the foam cores using a double-sided tape.

In another embodiment, the fire barrier assembly is made up of multiple elongated fire barriers that are spliced together in a male-female configuration. The foam core in one of the units does not extend to the end of the fabric wrap (i.e., the female unit) and this allows for a male unit with foam extending to the end of the fabric wrap or beyond it to be inserted into the female unit so that the two are spliced together.

In another embodiment the upper foam core and both layers of the lower foam core are polyurethane foams.

The strength of the fabric wrap and the compressibility of the foam allows the first modular unit to be dropped adjacent to the second modular unit without damaging the fire barrier. Likewise, the second modular unit could be raised versus the first modular unit without damaging the fire barrier

BRIEF DESCRIPTION OF THE DRAWINGS

FIG. 4(*b*) is a front view of the anchor attachments of the fire barrier assembly

DETAILED DESCRIPTION OF THE PREFERRED EMBODIMENTS

Figure 1:
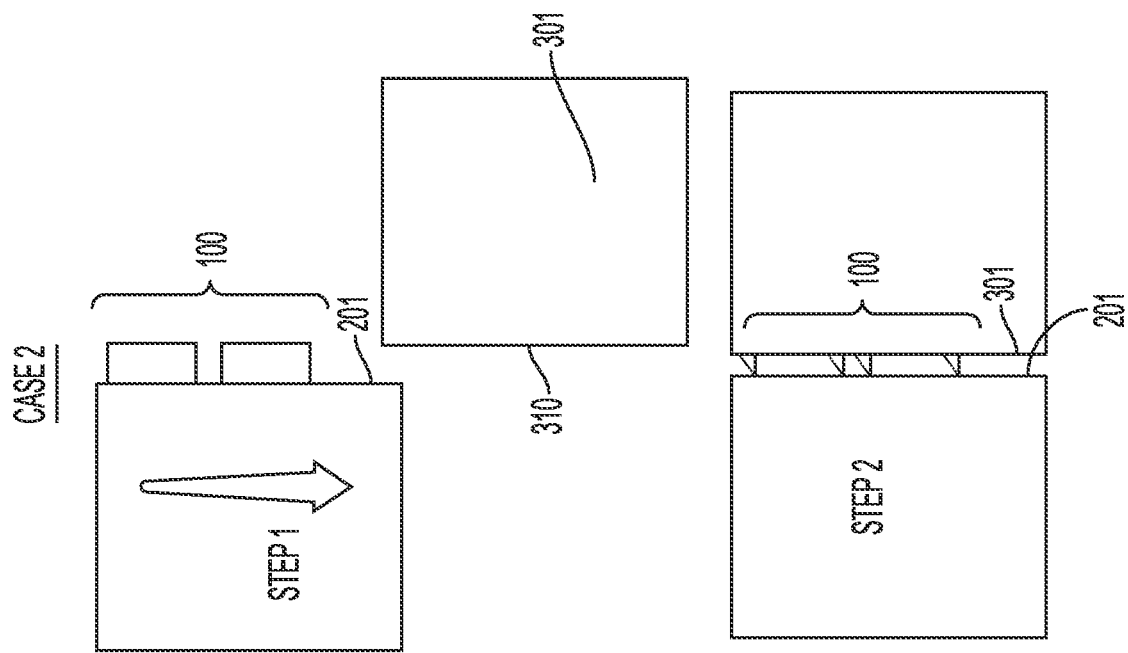
FIG. 1 shows two different ways in which modular building units can be brought adjacent to each other.
Figure 1:
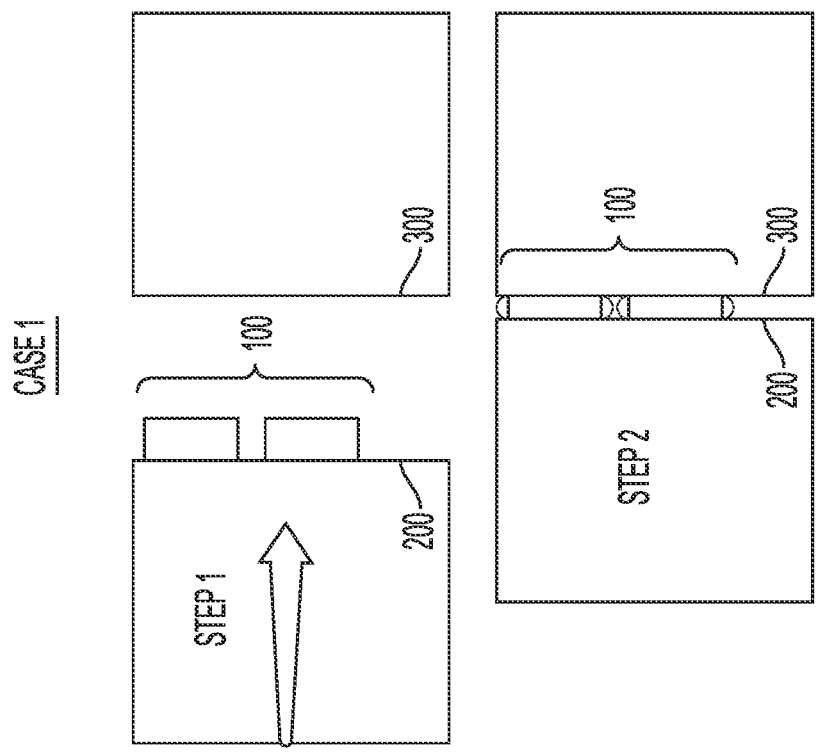

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

The term "coupled" and the like, and variations thereof, as used herein and in the appended claims are intended to mean either an indirect or direct connection or engagement. Thus, if a first device couples to a second device, that connection may be through a direct connection, or through an indirect connection via other devices and connections.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

The present invention now will be described more fully hereinafter with reference to the accompanying drawings, in which some preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, traditional fire barriers are installed in an expansion joint of a building after the joint is in place. This is labor and time intensive and may result in suboptimum results depending on the labor at the site.

As a new building constructions technique, prefabricated concrete floors or Gypsum walls are installed and assembled at a site which turns into a finished building. Expansion joint gaps created during this building assembly needs to be fire, sound, and air leakage proof as per building codes. Installing a fire barrier after the assembly process is a labor-intensive process. Pre attaching fire barriers at a factory to one of the joint faces of the prefab construction (concrete floor or Gypsum walls) will eliminate the labor to install fire barriers. Accordingly, fire barrier assembly is pre-attached to either concrete floor or gypsum wall at the factory and transported to the site. The fire barrier assembly is attached to a joint face of the building and is dropped or slid into place. When in place the fire barrier assembly will be compressed or seal the joint completely to protect the joint from fire, sound, or air leakage. This expansion joint may or may not move.

Figure 2:
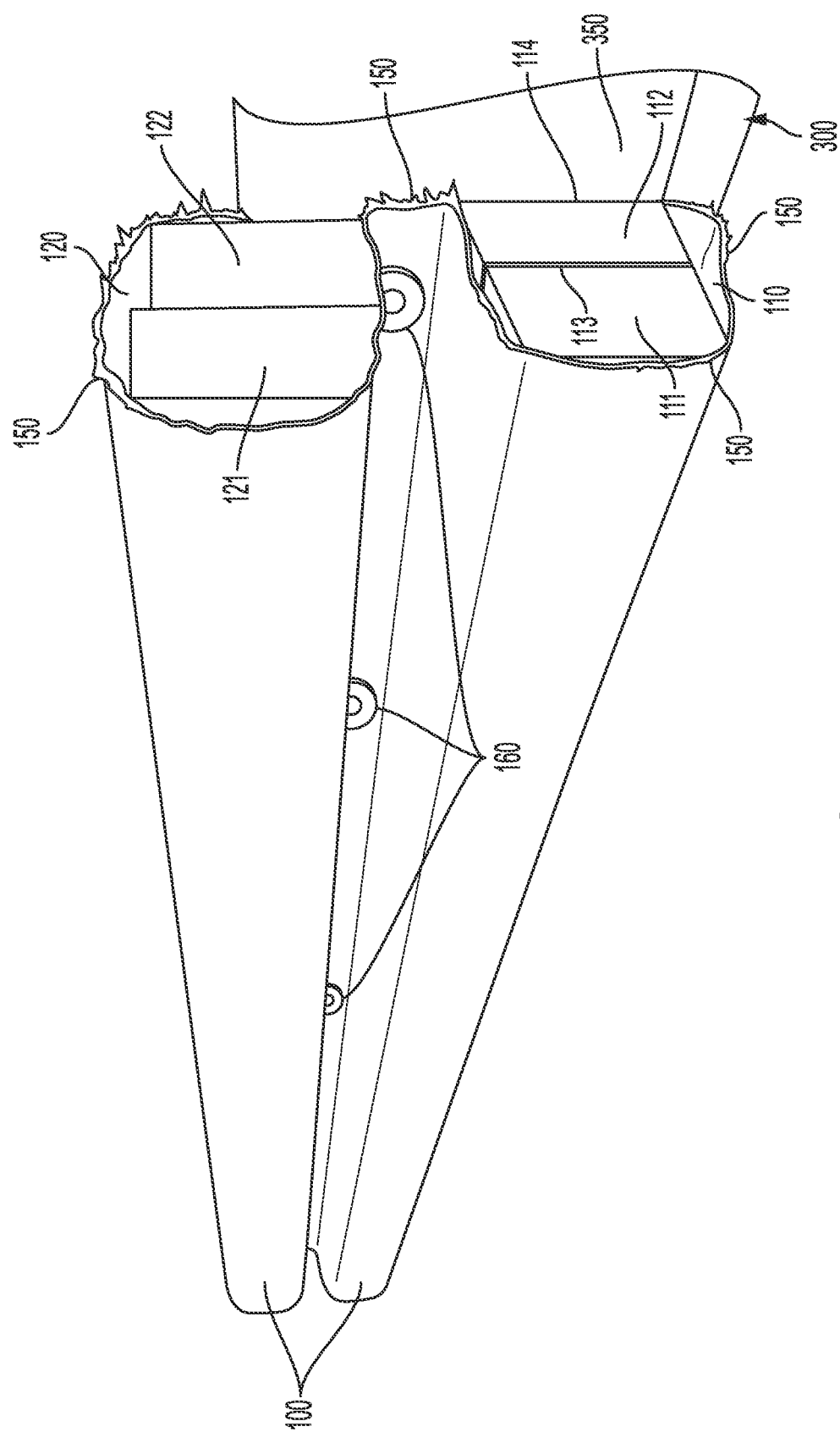
FIG. 2 is a perspective view of one embodiment of a fire barrier assembly attached to a building surface.

As shown in FIG. 1, Case 1, two different building surfaces can be brought together so that that the moving unit is moved perpendicular to the joint surface. In this case anything attached to the joint surface of either of the two units 200 and 300 (e.g., a fire barrier assembly) is compressed. FIG. 1, Case 1 shows fire barrier assembly 100 attached to building unit surface 200 and compressed against unit 300. As shown in FIG. 2. Case 2, the other alternative is for the building unit 201 to be moved parallel to the joint surface 310 of the adjacent building unit 301. In this case, anything attached to the joint surface of either of the two units (e.g., fire barrier assembly 100) will come under extreme shear force in addition to the compression in Case 1.

FIG. 2, illustrates one embodiment of a fire barrier assembly 100 of the present invention. Fire barrier assembly 100 is attached to first surface 350 of modular building unit 300. Modular building unit 300 is intended to be positioned adjacent to a second surface on a second modular building unit (not shown in FIG. 2). Fire barrier assembly 100 is comprised of lower foam core 110 and upper foam core 120. Upper foam core 120 is spaced apart from lower foam core 110 by a gap 109. Lower foam core 110 has first layer of foam 111 and second layer of foam 112 with first intumescent layer 113 sandwiched between the first and second foam layers and second intumescent layer 114 adjacent to surface 350. There may be more than two layers of intumescent material and more than two layers of foam. Upper foam core 120 is shown with a first upper foam layer 121 and second upper foam layer 122 but there could be a single layer of foam or more than two layers of foam. It is also possible that the upper foam core could also have one more intumescent layers. The thickness of the foam varies according to the joint size and movement requirements.

Referring still to FIG. 2, to protect, fire barrier assembly (especially during a Case 2, parallel drop as shown in FIG. 1), fire barrier assembly 100 has outer fabric wrap 150. Outer fabric wrap 150 surrounds both lower foam core 110 and upper foam core 120 and bridges the gap 109 between them. To attach fire barrier assembly 100 to surface 350 are a series of fasteners 160. Fasteners 160 penetrate through fabric wrap 150 at both gap 109 and below lower foam core 110 and go into the surface 350 of building unit 300. The spacing of the fasteners is from 1 inch to 40 inches along gap 109 and also staggered below lower foam core 110 from 1 inch to 40 inches (See FIG. 4(b)). Most preferably spacing is between 10 to 20 inches. FIG. 4(b) shows spacing at 20 inches. The fasteners need to have either washers or enlarged heads so that fabric wrap 150 does not pull away from surface 350 during the placement of the building units. The washer or head should have a minimum outer diameter of at least 0.5 inches and anchor diameter of at least 0.125 inches. Alternatively, the fabric 150 may be attached to the surface 350 using a fire rated adhesive or mastic.

In at least one embodiment first intumescent strip 113 and second intumescent strip 114 are 2 mm intumescent strips. They are available commercially under the tradename BlazeSeal from RectorSeal, LLC of Houston, TX.

Figure 3:
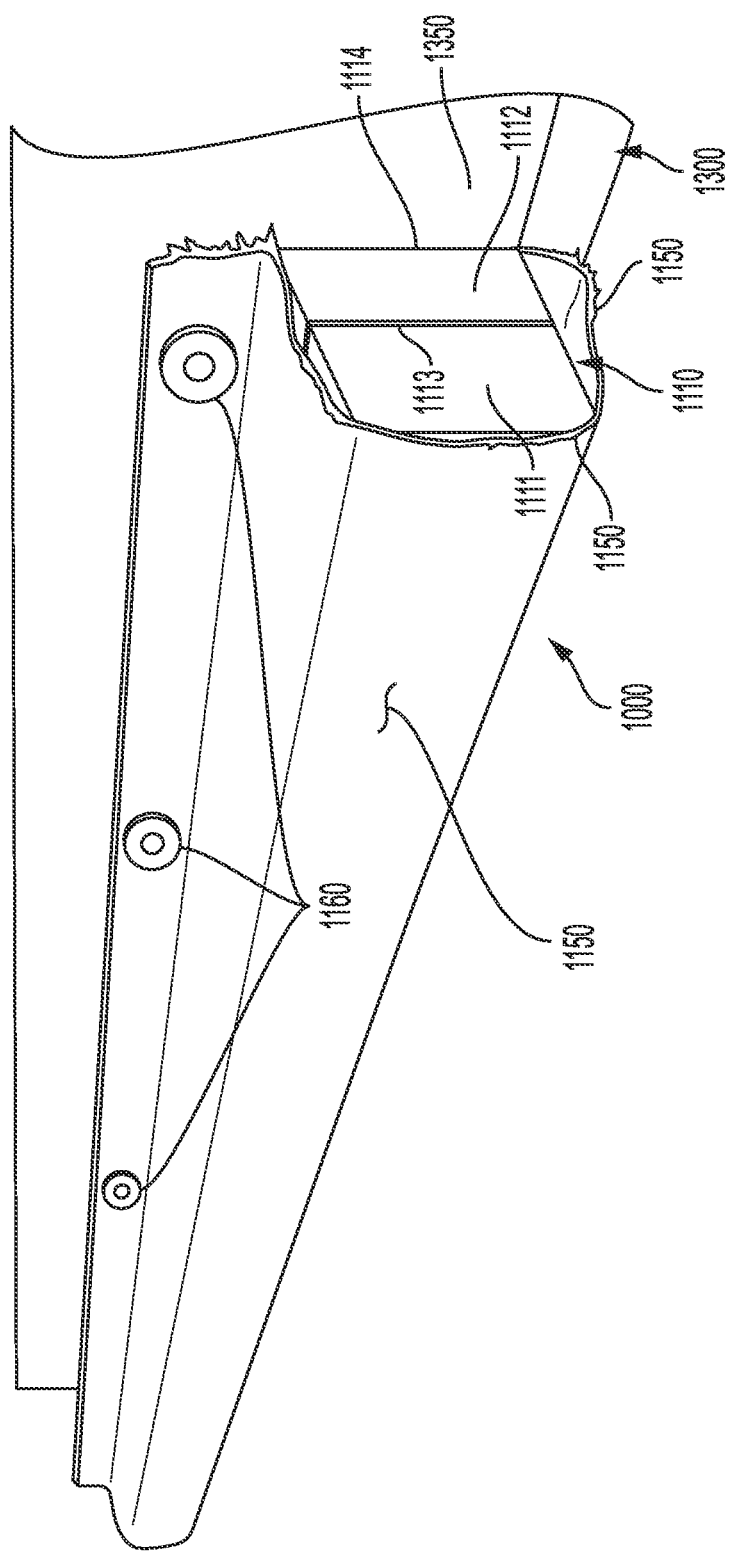
FIG. 3 is an alternate embodiment of a fire barrier assembly attached to a building surface.

FIG. 3 shows an alternate embodiment of the present invention of fire barrier assembly 1000 having a single foam core 1110 attached to surface 1350 of modular building unit 1300. Again, modular building unit 1300 is intended to be positioned adjacent to a second surface on a second modular building unit (not shown in FIG. 3). Fire barrier assembly 1000 is comprised of foam core 1110. Foam core 1110 has first layer of foam 1111 and second layer of foam 1112 with first intumescent layer 1113 sandwiched between the first and second foam layers 1111 and 1112, and a second intumescent layer 1114 adjacent to surface 1350. There may be more than two layers of intumescent material and more than two layers of foam. The thickness of foam 1111 and 1112 varies according to the joint size and movement requirements. A fire barrier wrap 1150 is wrapped around foam core 1110. Alternatively, the single foam core 1110 may include a single layer of foam adjacent a single intumescent layer surrounded by a fire barrier fabric wrap and using fastener to attach the fiber warp to the structure surface.

Referring still to the embodiment shown in FIG. 3, fire barrier assembly 1000 is attached to surface 1350 with a series of fasteners 1160. Fasteners 1160 penetrate through fabric wrap 1150 and go into the surface 1350 of building unit 1300. The spacing of the fasteners is from 1 inch to 40 inches along the top and bottom of foam core 1110, most preferably the spacing is between 10 to 20 inches. The fasteners need to have either washers or enlarged heads so that fabric wrap 1150 does not pull away from surface 1350 during its placement to building unit 1300. The washer or head should have a minimum outer diameter of at least 0.5 inches and anchor diameter of at least 0.125 inches. Alternatively, the fabric wrap 1150 may be attached to the surface 350 using a fire rated adhesive or mastic. All such forms at attachment are referred to hereafter as fasteners. Additionally, the single foam core 1110 having a single layer of foam adjacent a single intumescent layer surrounded by a fire barrier fabric wrap as mentioned above may be fastened by fasteners as discussed above.

Figure 5:
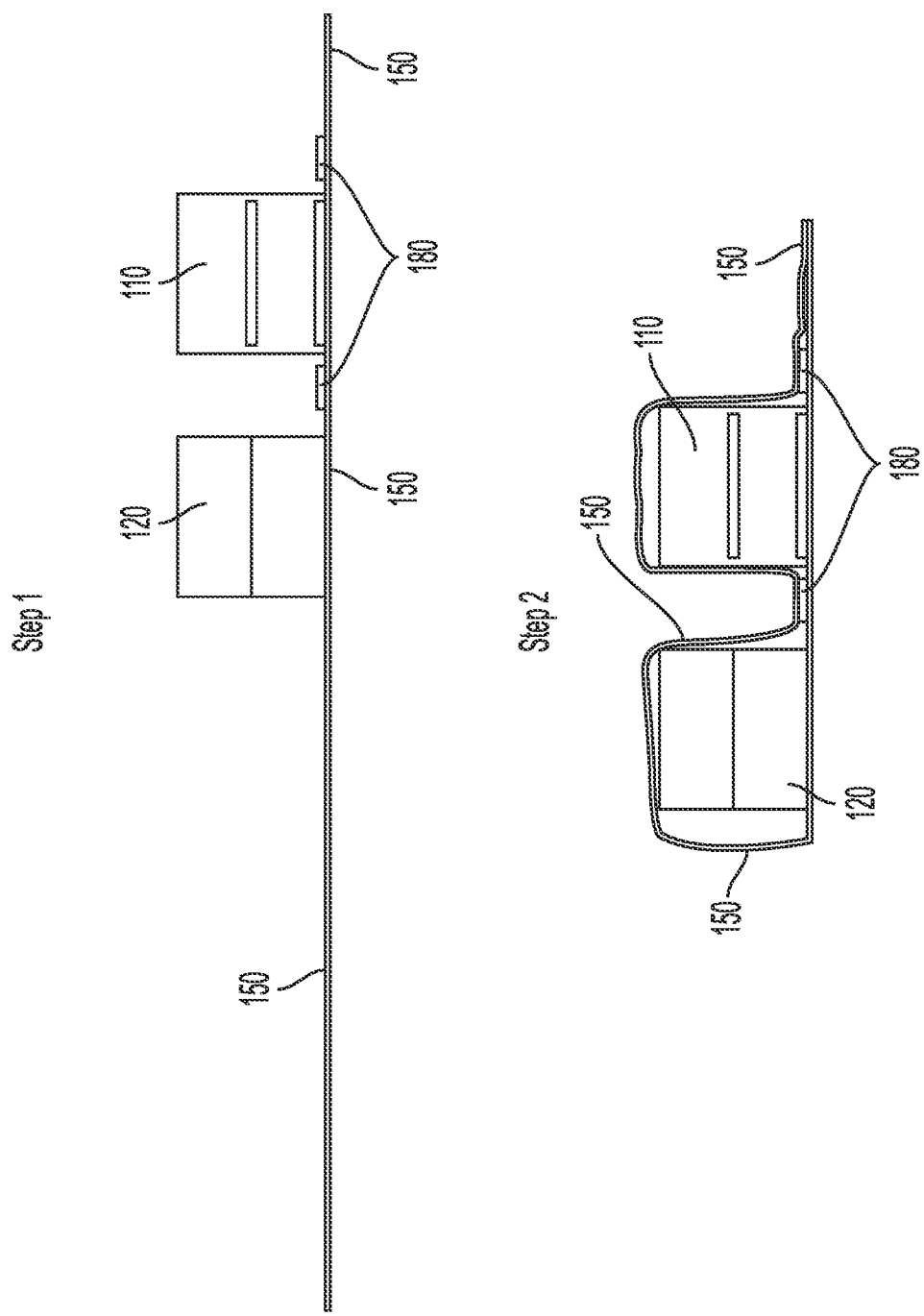
FIG. 5 shows how the fire barrier assembly is fabricated.

To attach the intumescent sheets of either embodiment shown in FIGS. 2 and 3 to the foam, the intumescent sheets are laid flat onto a table and adhered to the foam blocks using spray adhesive (See FIG. 5). In at least one embodiment the elongated foam block is polyurethane foam available commercially from PTI Foam. A commercially available spray adhesive usable is "Chemsafe Ram-Tak" Adhesive Spray from Aramsco of Paulsboro, NJ.

FIG. 5 also shows how fabric wrap 150 is wrapped around foam blocks 110 and 120 using very high bond (VHB) double sided tape 180 of the embodiment shown in FIG. 2 (such as 3M 5925 VHB acrylic foam tape); however, the same process is used for a single foam core 1110 as shown in FIG. 3. As shown in FIG. 5, fabric wrap 150 is laid on a flat surface with the aluminum coating side facing up. Foam cores 110 and 120 and both double side tapes 180 are placed on the fabric wrap 150. Fabric wrap 150 is wrapped around the upper sides of both foam cores and double-sided tapes to form the fire barriers assembly. Again, the same process is used for a single foam core 1110 as shown in FIG. 3.

Outer fabric wrap 150/1150 must be extremely robust and preferably also fire resistant. In one embodiment outer wrap fabric 150/1150 is an aluminum coated glass fabric. A commercially available product is 2025 Al from Integrated Marketing Group. The specifications for 2025 AL are set forth below.

| | VALUES |
|---|---|
| Weight | 19.5 oz/sy (661.2 g/sm) +/− 10% |
| Thickness | 0.026 inches (.6604 mm) +/− 10% |
| Tensile Strength | Warp: 250 lbs./inch (44.6 kg/cm) (44.6 kg/cm) |
| | Fill: 250 lbs./inch (44.6 kg/cm) (44.6 kg/cm) |
| Tear Strength | Warp: 50 lbs. (22.7 kg) (22.7 kg) |
| | Fill: 50 lbs. (22.7 kg) (22.7 kg) |
| Burst Strength | 550 psi (38.7 kg/scm) (38.7 lb/scm) |
| Flame Resistance | Char length: 1 inch max |
| | Afterglow: 1 second max |
| | Flame out: 1 second max |
| Temperature Resistance | Service Temp = 300°-350° F. (148.9° C.-176.7° C.) |

At a minimum, the tensile strength of fabric wrap 150/1150 is preferably at least about 25 lbs./inch. As noted above, the inner surface of the fabric wrap preferably has an aluminum coating as specified for 2025 AL and the outer surface of fabric wrap 150/1150 is a glass fabric.

Figure 4A:
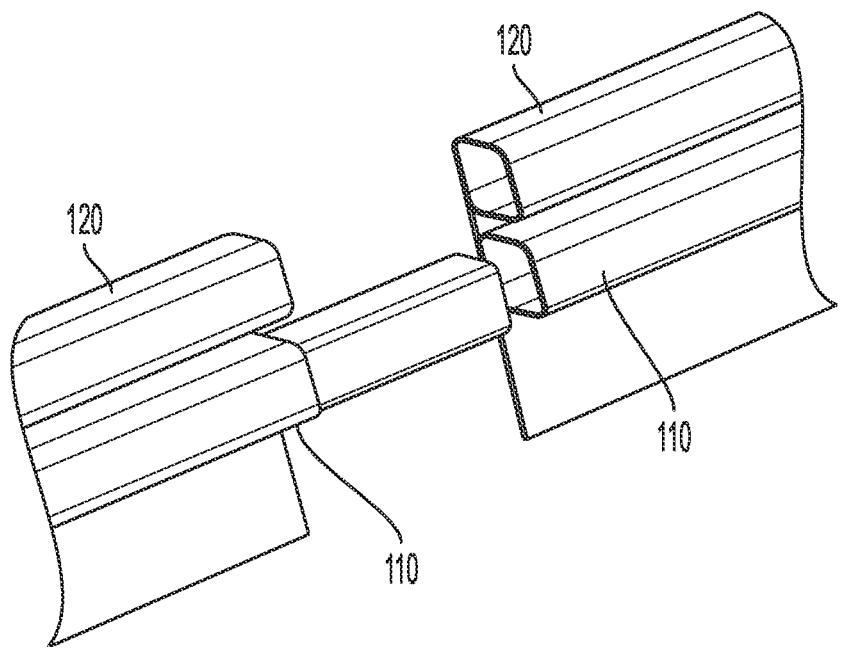
FIG. 4(*a*) is an isometric view of a spliced configuration of the fire barrier assembly.
Figure 4B:
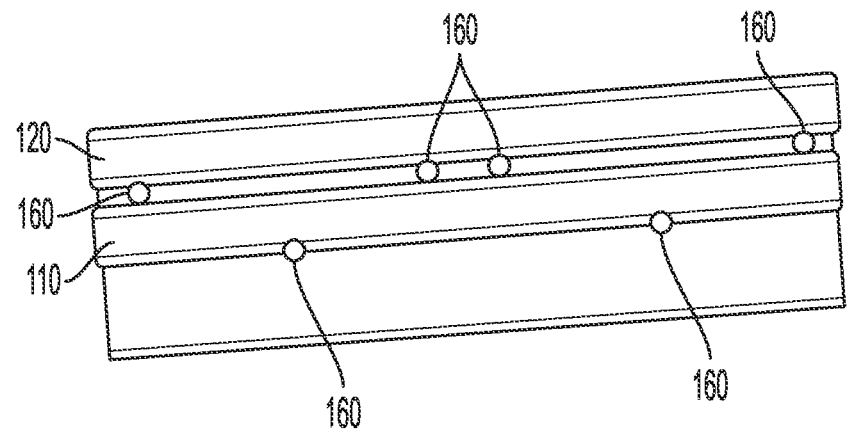

Turning now to FIG. 4(a), in at least one embodiment different sections of fire barrier assembly 100 are spliced together using a male-female configuration for foam cores 110 and 120. Similarly, for the alternate embodiment shown in FIG. 3, different sections of fire barrier assembly 1000 may be spliced together in a similar manner using a male-female configuration for foam cores 1110.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An elongated fire barrier assembly intended to be positioned between adjacent surfaces of two modular building units, comprising:
   a first foam core having a first layer of foam, a second layer of foam and an intumescent layer sandwiched between the first and second layers of foam;
   an outer wrap of a fire-resistant fabric surrounding the first foam core; and
   fasteners configured to attach the first foam core and the outer wrap to a first surface of one of the building units.

2. The elongated fire barrier assembly of claim 1, further comprising a second foam core spaced apart from the first foam core by a gap.

3. The elongated fire barrier assembly of claim 2, wherein the fasteners are mounted to the fire-resistant fabric at the gap.

4. The elongated fire barrier assembly of claim 1, wherein the fasteners comprise screws.

5. The elongated fire barrier assembly of claim 1, wherein the fasteners comprise an adhesive.

6. The elongated fire barrier assembly of claim 1, further comprising a second elongated fire barrier assembly, and wherein the elongated fire barrier assembly and the second elongated fire barrier assembly are spliced together in a male-female configuration.

7. The elongated fire barrier assembly of claim 1, wherein the fire-resistant fabric is an aluminum coated glass fabric.

8. The elongated fire barrier assembly of claim 1, wherein the fire-resistant fabric is coupled to the first foam core with double-sided tape.

9. The elongated fire barrier assembly of claim 2, wherein the fire-resistant wrap is coupled to the first and second foam cores with double-sided tape.

10. The elongated fire barrier assembly of claim 2, wherein the first and second foam cores comprise polyurethane foam.

11. An elongated fire barrier assembly intended to be positioned between adjacent surfaces of two modular building units, comprising:
 a first foam core having a first layer of foam, a second layer of foam and an intumescent layer sandwiched between the first and second layers of foam;
 an outer wrap of a fire-resistant fabric surrounding the first foam core; and
 fasteners configured to attach the first foam core and the outer wrap to a first surface of one of the building units.

12. The elongated fire barrier assembly of claim 11, further comprising a second foam core spaced apart from the first foam core by a gap.

13. The elongated fire barrier assembly of claim 12, wherein the fasteners are mounted to the gap.

14. The elongated fire barrier assembly of claim 11, further comprising a second elongated fire barrier assembly, and wherein the elongated fire barrier assembly and the second elongated fire barrier assembly are spliced together in a male-female configuration.

15. An elongated fire barrier assembly intended to be positioned between adjacent surfaces of two building units, comprising:
 a first foam core having a first layer of foam, a second layer of foam, and at least one intumescent layer sandwiched between the first and second foam layers;
 a second foam core spaced apart from the first foam core by a gap;
 an outer wrap of a fire-resistant fabric surrounding the first foam core; and
 a plurality of fasteners mounted to the gap.

16. The elongated fire barrier assembly of claim 15, further comprising a second elongated fire barrier assembly, and wherein the elongated fire barrier assembly and the second elongated fire barrier assembly are spliced together in a male-female configuration.

17. The elongated fire barrier assembly of claim 15, wherein the fire-resistant fabric is comprises an aluminum coated glass fabric.

18. The elongated fire barrier assembly of claim 15, wherein the fire-resistant fabric is attached to the first and second foam cores with double-sided tape.

19. The elongated fire barrier assembly of claim 15, wherein the first core and second foam cores comprise polyurethane foam.

20. A plurality of elongated fire barrier assemblies, each assembly intended to be positioned between adjacent surfaces of two building units, the fire barrier assembly comprising:
 a first foam core having a first layer of foam, a second layer of foam, and at least one intumescent layer sandwiched between the first and second layers of foam;
 a second foam core spaced apart from the first foam core by a gap;
 an outer wrap of a fire-resistant fabric surrounding the first and second foam cores; and
 fasteners to attach the fire barrier assemblies to a first surface of one of the building units at the gap, wherein the multiple elongated fire barriers are spliced together in a male-female configuration.

21. The plurality of elongated fire barrier assemblies of claim 20, wherein the fire-resistant fabric comprises an aluminum coated glass fabric.

22. The plurality of elongated fire barrier assemblies of claim 20, wherein the fire-resistant fabric is attached to the first and second foam cores with double-sided tape.

23. The plurality of elongated fire barrier assemblies of claim 20, wherein the first and second foam cores comprise polyurethane foam.

* * * * *